(No Model.)  5 Sheets—Sheet 1.

J. FORBES.
MACHINE FOR MOLDING ARTICLES IN SAND.

No. 467,930.  Patented Feb. 2, 1892.

Witnesses.
David E. Tracy
J. Hervey Patton

Inventor:
John Forbes (No Model.)  5 Sheets—Sheet 2.

J. FORBES.
MACHINE FOR MOLDING ARTICLES IN SAND.

No. 467,930. Patented Feb. 2, 1892.

Witnesses.
David E. Tracy
J. Hervey Patton

Inventor.
John Forbes (No Model.) 5 Sheets—Sheet 3.
J. FORBES.
MACHINE FOR MOLDING ARTICLES IN SAND.
No. 467,930. Patented Feb. 2, 1892.
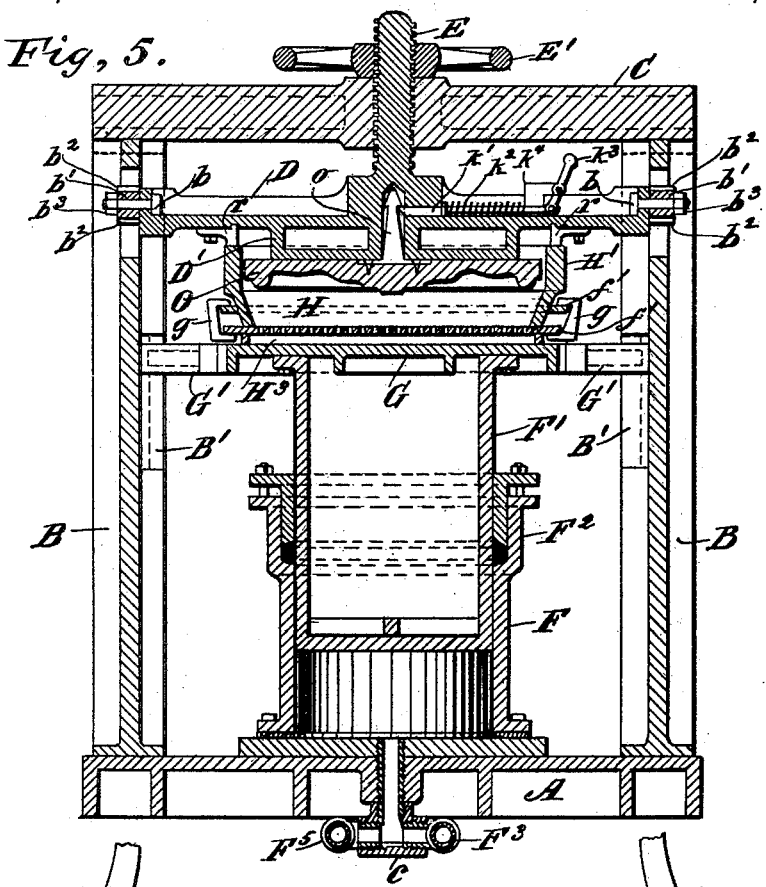
Fig. 5.
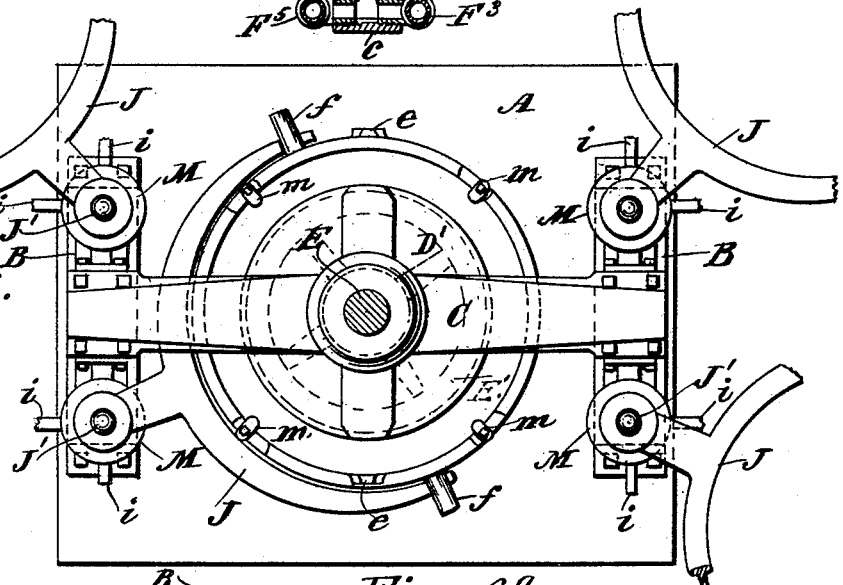
Fig. 6.
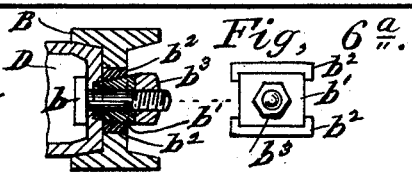
Fig. 6ª.
Witnesses.
David E. Tracy
J. Hervey Patton
Inventor.
John Forbes (No Model.) 5 Sheets—Sheet 4.
J. FORBES.
MACHINE FOR MOLDING ARTICLES IN SAND.
No. 467,930. Patented Feb. 2, 1892.
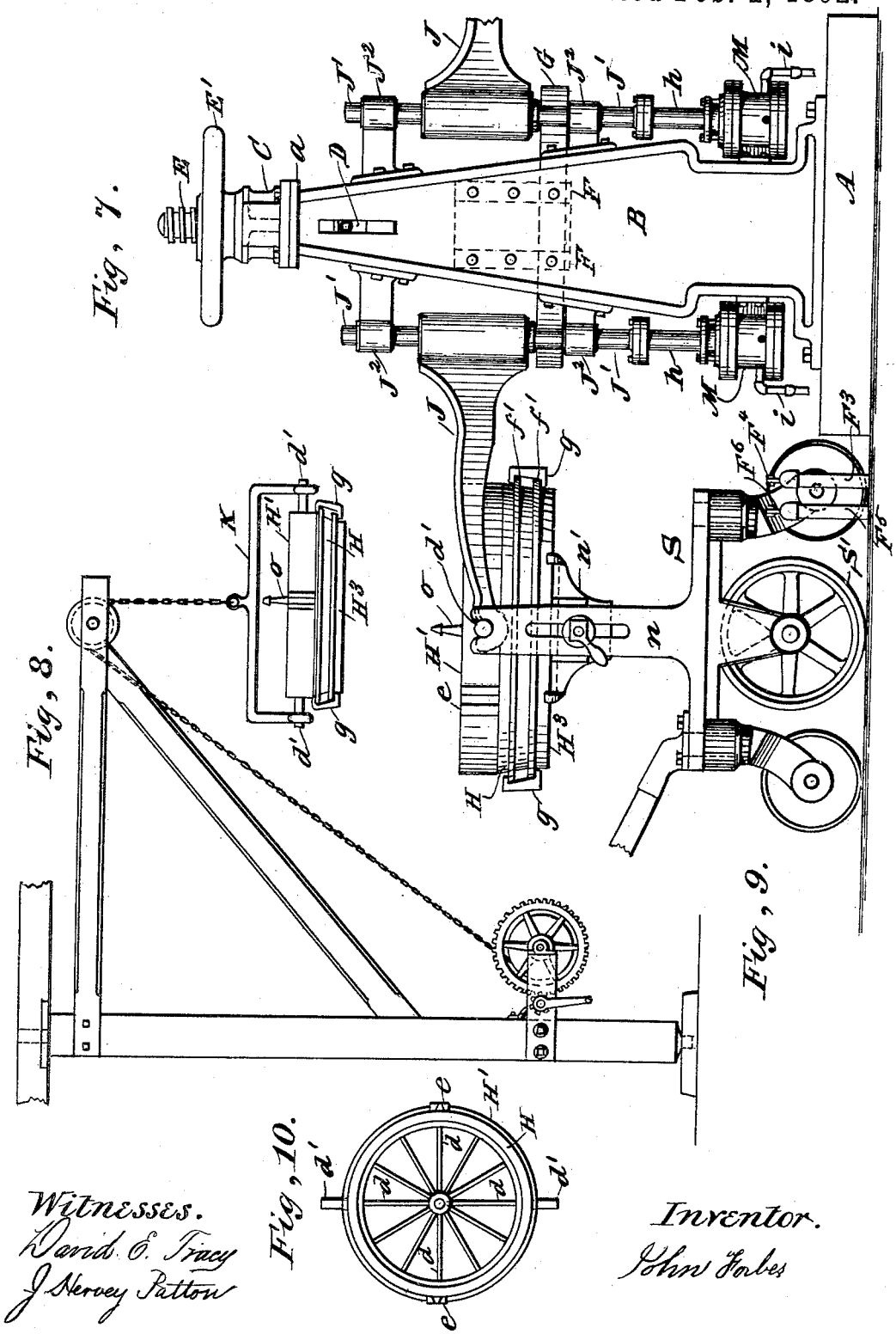
Witnesses.
David E. Tracy
J. Hervey Patton
Inventor.
John Forbes
THE NORRIS PETERS CO., PHOTO-LITHO., WASHINGTON, D. C.

(No Model.) 5 Sheets—Sheet 5.
J. FORBES.
MACHINE FOR MOLDING ARTICLES IN SAND.
No. 467,930. Patented Feb. 2, 1892.
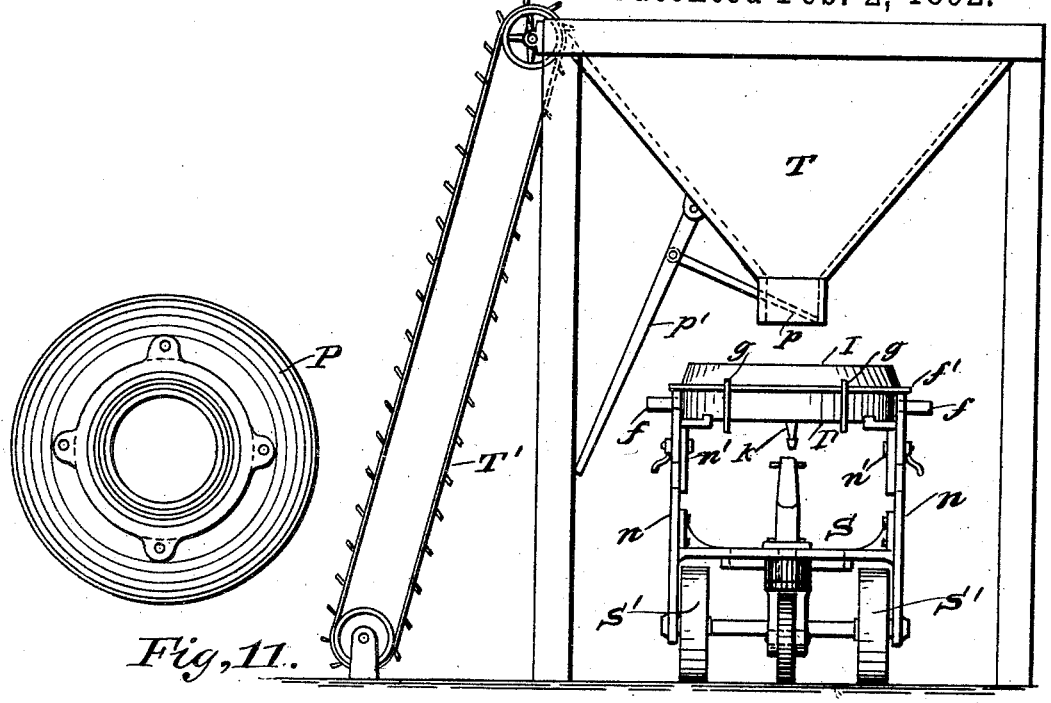
Fig. 11.
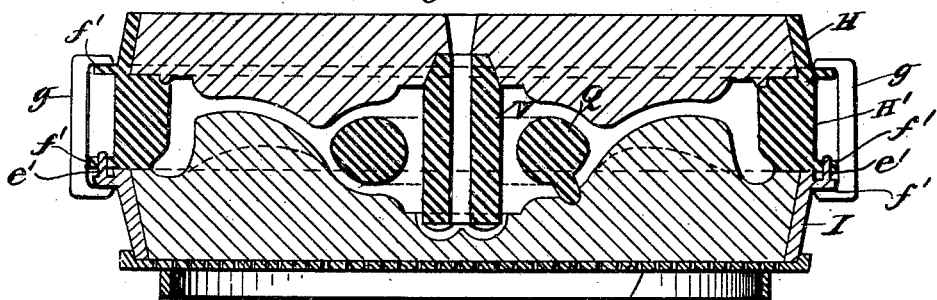
Fig. 13.
Fig. 12.
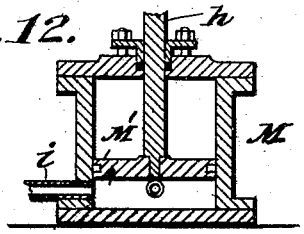
Witnesses.
David E. Tracy
J. Hervey Patton
Inventor.
John Forbes

UNITED STATES PATENT OFFICE.

JOHN FORBES, OF HARRISBURG, PENNSYLVANIA, ASSIGNOR OF TWO-THIRDS TO WILLIAM T. HILDRUP, JR., AND WILLIAM H. FORBES, OF SAME PLACE.

MACHINE FOR MOLDING ARTICLES IN SAND.

SPECIFICATION forming part of Letters Patent No. 467,930, dated February 2, 1892.

Application filed February 10, 1891. Serial No. 380,909. (No model.)

*To all whom it may concern:*

Be it known that I, JOHN FORBES, a native-born citizen of the United States, residing at Harrisburg, in the county of Dauphin and State of Pennsylvania, have invented certain new and useful Improvements in Machines for Molding Articles in Sand; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improved machine for molding articles in sand that are to be cast into form, and more particularly for the molding of chilled car-wheels, the objects being to produce a simple, convenient, and practical device for the purpose indicated, and also to provide a novel method of manipulation and coacting auxiliary apparatus whereby the operation of wheel-molding is rapidly and perfectly effected.

To these ends my invention consists in the construction and combination of parts, as is hereinafter described, and indicated in the claims.

Reference is to be had to the accompanying drawings, forming a portion of this specification, in which similar letters of reference indicate corresponding parts in all the views.

Figure 1:
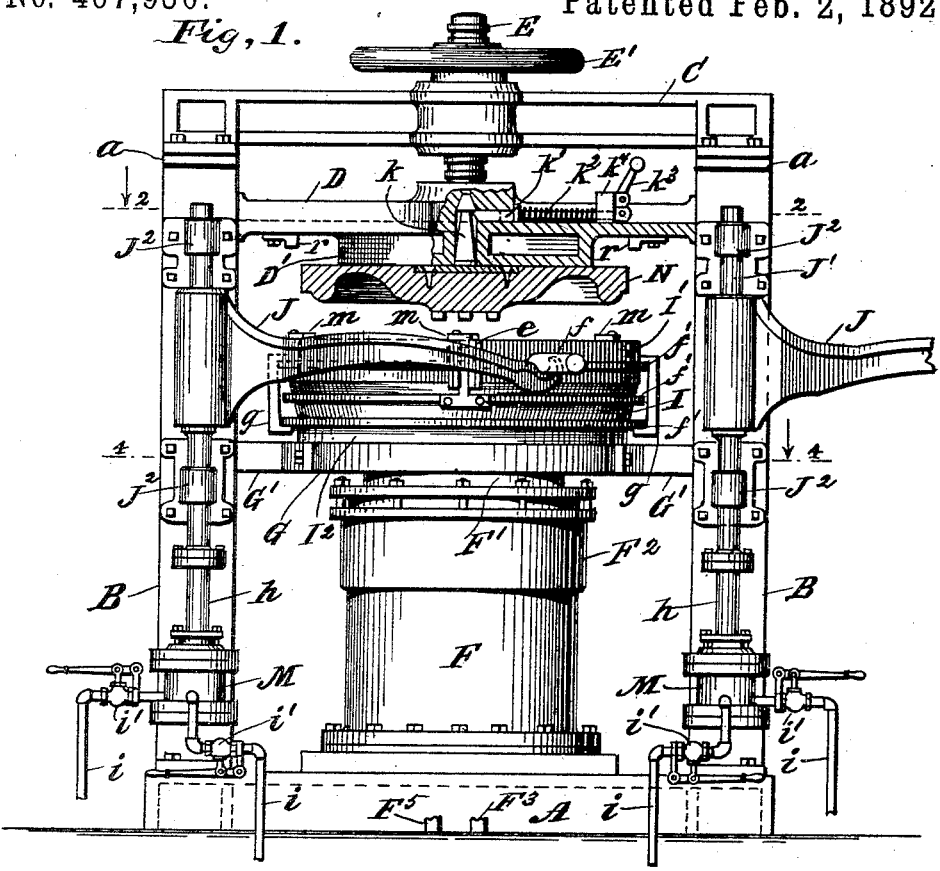
Figure 2:
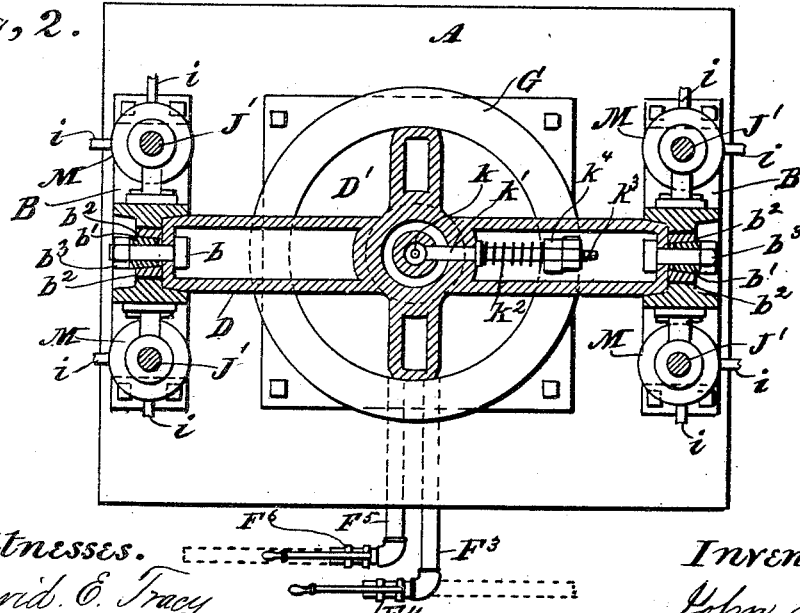
Figure 3:
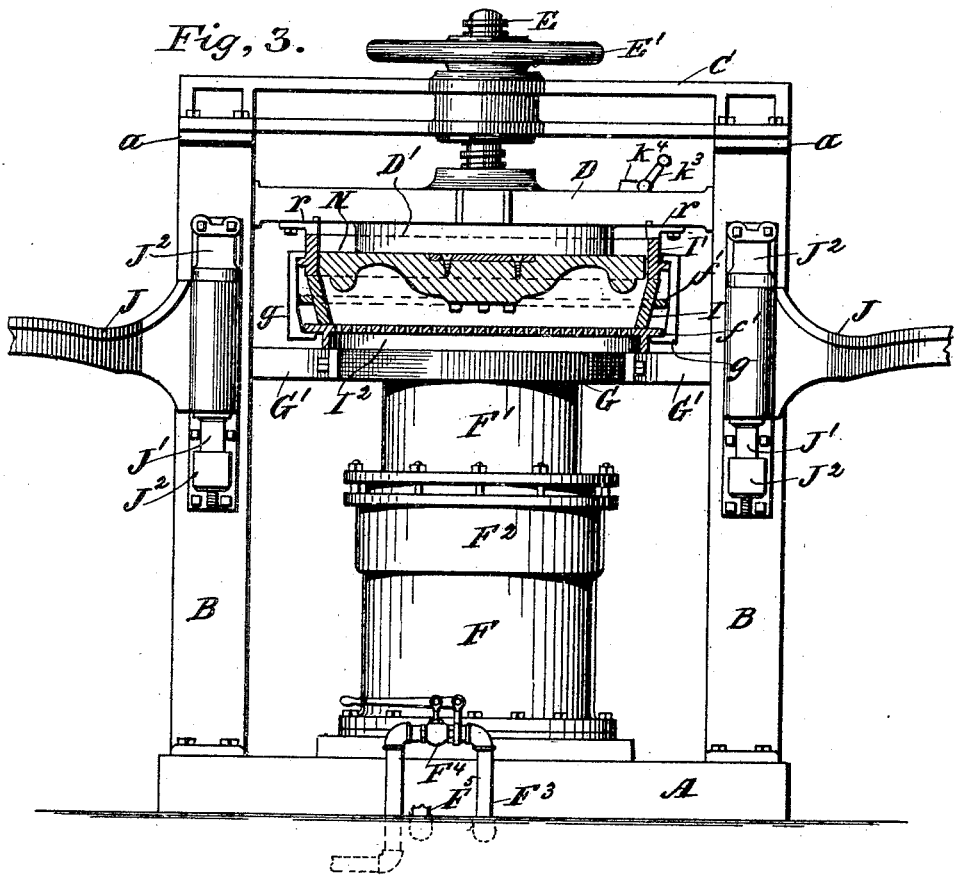
Figure 4:
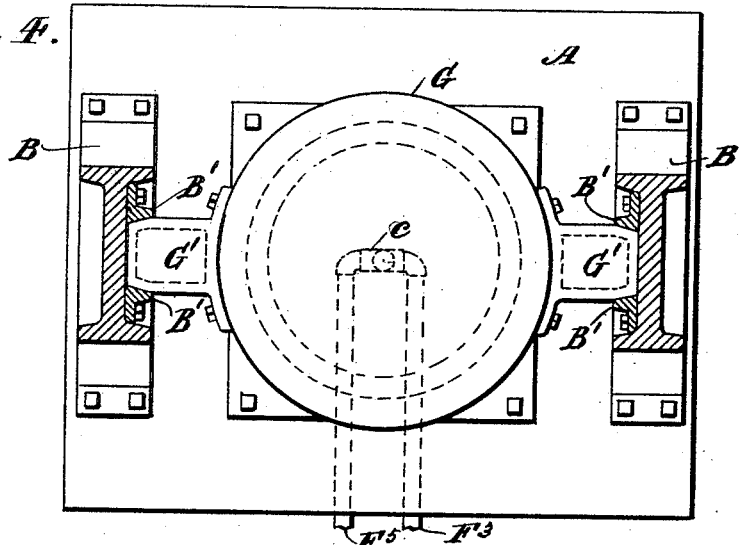

Figure 1 is a front elevation of the molding-machine in preferred form, partly in section, with some of the details broken away, a flask-section being shown in position on the platen of the machine, and a pattern. Fig. 2 is a plan, partly in section, of main portions of the machine, some parts being removed and others broken away, the section being indicated by the line 2 2 in Fig. 1. Fig. 3 represents a front elevation of the molding-machine, showing some parts broken away, a flask-section in position on the machine, and a pattern within the flask-section. Fig. 4 is a plan view, partly in section, of main portions of the machine with some of the details removed, the section being indicated by the line 4 4 in Fig. 1. Fig. 5 is a side elevation, in section, of the machine, taken through the transverse center, some details being removed, and a flask-section shown in position on the platen. Fig. 6 is a plan of the molding-machine, partly in section, and some of the details broken away. Fig. 6ª represents a plan in section, and also an end elevation, of one end of the adjustable cross-head of the machine detached and enlarged, showing means for connecting it to the frame-housings of the machine. Fig. 7 is an end elevation of the molding-machine in preferred form, showing one of its swinging crane-arms extended and engaging a flask-section, an opposite arm being shown broken, the hydraulic connections for the lifts which raise and lower said arms being also shown incomplete. Fig. 8 represents a flask-section suspended from a fixed crane that is employed to remove the molded flask-sections from a transporting device. Fig. 9 represents a flask-carriage, preferably used to support the flask-sections when these are being filled with molding-sand, and afterward to transfer the filled flask-sections to and from the molding-machine, a flask-section being shown in position on the carriage and engaged by one of the crane-arms of the machine for removal. Fig. 10 is a plan view of the top side of a "cope" flask-section or upper part of the flask. Fig. 11 represents a sand-elevator, an elevated sand-hopper, and a flask-section supported on a transfer-carriage below the hopper ready to receive molding-sand therefrom. Fig. 12 is a vertical axial section, enlarged and detached, of one of the hydraulic lift-cylinders used in connection with the crane-arms of the molding-machine, the plunger-head and rod being broken, and water-passages being also shown; and Fig. 13 is a transverse section, enlarged, of two flask-sections assembled, containing a completed mold for a double-plate car-wheel, the cores and tread-chill being in place, and gate-aperture formed ready to receive metal.

In order to afford a clear comprehension of the generic features of the invention in advance of the detailed description, a brief explanation will be given of the several steps in the process, and afterward a more explicit specification of the molding-machine proper and the auxiliary apparatus used to carry into effect and expedite the process of molding chilled car-wheels.

The molding-machine forming a portion of my invention is designed to press with equal force the molds formed in the cope and drag sections of a flask, there being a pattern of different form provided for each of said sections, which patterns respectively represent the form to be given to the mold for the rear face and outer face of a car-wheel.

The cope-section of the flask is furnished with a chiller for the wheel-tread, which chiller remains attached to this portion of the flask after the mold is formed in it. The appropriate pattern is placed in the cope-section and therein supported with its flat side aligned with the free edge of the chiller-ring by suitable means. Preferably the flask-section is placed on the standards of a movable carriage by an engagement of its oppositely-projecting trunnions with said standards, the pattern being held level and the flask-section also, the latter named being so adjusted on the standards of the vehicle that the pattern-face will be adapted to receive sifted sand that enters the flask-section.

The transfer-carriage may be moved to any point and the flask-section on it filled with sand properly sifted. This may be prepared on the molding-floor and thrown by hand into the flask-section. Preferably there is an elevated sand-hopper placed at some point on the molding-floor, which is furnished with sand by an elevating device, said hopper being adapted to deliver sand, as required, into a flask-section that has been placed in position below it, the transfer-carriage being utilized to move the flask-sections toward or from the hopper. After a flask-section is properly supplied with sand it is transported on the carriage to the molding-machine, whereon it is placed with the pattern reversed and a bottom plate secured on the lower side. There is a projecting shank on the pattern that will lock fast to an abutment-plate of the molding-machine when the flask-section is properly centered, and then moved upwardly. The flask-section is located upon a vertically-movable platen of the machine, which is preferably actuated by hydraulic pressure, but may receive motion from other sources of power. As the abutment-plate is horizontal and is retained in a fixed position while the platen moves upwardly toward it, the elevation of the flask-section will cause the pattern to engage the sand in the flask portion and forcibly compress it a proper degree, which can be determined with accuracy. This completes the molding operation for one-half of the car-wheel. A reverse motion is now given to the platen of the machine, which will lower the molded flask-section away from the pattern that is held in a level position fast on the abutment in a manner similar to the ordinary hand process—that is to say, drawing the pattern from the mold which is left with the molded surface on top, and by the perfection of the operation avoiding injury to the mold, which is compacted with equal density throughout its area. After the pattern is drawn, as stated, the molded flask-section is removed from the machine, and the drag portion of the flask, having its appropriate pattern in place and filled with sand ready for pressure, is placed in position and the pressing operation repeated. When the two sections of a wheel have been molded, the cope and drag-flask sections are assembled by locating the cope on the drag after the proper cores are placed within. The flask-sections are now clamped together ready for the reception of molten metal.

Referring to the drawings, A represents the base-plate of the molding-machine, preferably cast from metal, rectangular and of proper dimensions for its service. Upon the base-plate A two similar housing-pieces B are erected and secured parallel to each other, and, as shown in Fig. 7, said housings are sloped on their edges from the base upwardly, these converging edges terminating in cap-plates $a$, whereon the cross-beam C is mounted and secured.

Below the cap-plates $a$, and near to them, the housings B are vertically and oppositely slotted a short distance for the adjustable connection therewith of the cross-head D. The cross-head just named is preferably cast from metal, and consists of a hollow beam having a short cylindrical piece D' formed on it and depending at its transverse center from the lower side, termed an "abutment-plate," and from the upper side of the cross-head, at its center, a vertical screw E projects through a mating aperture in the cross-beam C, said screw being engaged by a centrally-apertured and correspondingly-threaded hand-wheel E', that by its revoluble adjustment will elevate or lower the cross-head D, as may be required. The ends of the cross-head are secured to the housings B at any desired point by similar devices, which each consist of a heavy bolt $b$, whereon a rectangular and tapering sleeve $b'$ is slid, its side faces engaging the adjacent surfaces of two similar plates $b^2$, that are located on each side of the sleeve and have frictional contact with the sides of the slot through which each bolt and sleeve passes, the bolts also being inserted through holes in end walls of the cross-head whereon their heads bear. The outer threaded ends of the bolts $b$ are provided with screw-nuts $b^3$, which bear upon the outer ends of the sleeves $b'$, so that the movement of the nuts to screw them upon the bolts will spread the friction-plates $b^2$ and firmly lock the ends of the cross-head to the housings. The abutment-plate D' may also be formed upon the under side of the cross-beam C, if desired, and the cross-head be dispensed with. In either plan of construction the parts must be strongly formed and affixed to the housings to withstand vertical pressure from below.

At such a point on the base-plate A as will locate it in vertical alignment with the abutment-plate D' a cylinder F is secured with a water-tight joint. Said cylinder, forming the outer casing of a hydraulic press or motor, should be given a proper height and internal diameter for service, it being rendered truly cylindrical in the bore to receive a neatly-fitting true plunger F', that is preferably cast into form from metal, and is hollow, having an integral lower head that is properly braced to withstand pressure.

A stuffing-box F² is provided to form a water-tight joint between the vertically-movable plunger F' and the stationary shell or cylinder F. On the upper end of the plunger F' an enlarged circular platen G is secured, which is level on its top face and concentric with the bore of the cylinder F, having its axis coincident with that of the cylindrical abutment-plate D'. The platen G is guided by the opposite radial arms G', which are secured upon its periphery and project therefrom to have a sliding engagement with the guides B', which are formed upon or affixed to the inner faces of the housings B at opposite points a suitable distance from the base-plate A, the loose engagement of the arms with said guides serving to steady the movement of the platen when it is in motion and prevent its deviation from a horizontal plane. The hydraulic cylinder F is connected with a water-supply having sufficient force to do the work required by a water-induction pipe F³, having a lever-valve F⁴, that controls the flow of water into the cylinder, a similar discharge-pipe F⁵ being attached to the T-inlet c, which is also provided with a lever-valve F⁶, the discharge being regulated by it, the inlet and discharge water pipes shown by dotted lines broken in Fig. 2 being extended to connect with a water-main for supply and a sewer or other waste-conduit, respectively.

The wheel-molding flasks are provided in sufficient number to suit the capacity of the foundry and are alike in form, varying in size to accord with dimensions of different diameters of wheels, each flask being composed of a top and lower half-section, technically known as the "cope" and "drag" portions of the flask. The cope H is furnished with a chiller-ring H', (shown in Fig. 13,) connected to the upper portion of the cope, said ring being designed to chill the peripheral face or "tread" of the wheel, the portion H having radial arms d, provided as shown in Fig. 10, which hold the sand from falling from the flask-section when molded and in position for pouring metal into the completed mold.

On the chiller-ring H' at opposite points two similar trunnions d' are projected to afford means for easy handling of the cope by a crane.

The drag-section I of the flask is of substantially the same form as the cope proper and of the same dimensions, these flask-sections being provided with mating guides, that may be formed as shown in Figs. 1 and 9 at e or as represented in Fig. 13 at e', said guiding devices causing a proper imposition of the cope upon the drag when a wheel-mold is completed and the two sections are assembled.

A supplementary ring I' is provided for the drag-section I, which is removably secured on it by any proper means, guides and clamps (shown in Fig. 1) being preferred to clamp the supplementary ring on the flask-section and at the same time hold both parts in contact with a bottom plate I². The function of the supplementary ring I' is to temporarily increase the height of the flask-section or drag I, so as to afford space for the introduction of sand in a loose condition, said ring being afterward removed when the mold has been pressed in the machine.

There are opposite trunnions f formed on the supplementary ring I' to enable an operator to move the flask-section I and ring I', these projecting trunnions being engaged by devices, which will be described, that facilitate the manipulation of the flask-sections during the molding process.

There are projecting flanges f' formed on the sides of the flask-sections H I, and also on the supplementary ring I' and bottom plate I², to receive the ordinary clamps g, which hold the parts connected when this is needed in the molding operation.

As a convenient means for handling the flask-sections H I when these are to be successively placed upon and removed from the platen G of the molding-machine, there are crane-arms J provided, which are shown in position in Figs. 2 and 6. The crane-arms J are formed as semicircular yokes that are each of proper width between their curved limbs to allow the flask-sections H I to pass between them freely, the top surface of said limbs being grooved to receive the trunnions of the chiller-ring H' and supplementary ring I' when the cope and drag are to be placed singly upon the platen G. The crane-arms J are alike and preferably four in number, they being supported upon opposite edges of the housings B, so as to swing in a horizontal plane by their engagement with the vertical shafts J', that are loosely sustained in position by the boxes J², which are affixed upon the edge portions of the housings.

The crane-arms J may be retained in place free to swing by bracketed boxes alone, as represented in Fig. 3. When so supported the arms are placed in such a relative position as will best adapt them to transfer the flask-sections from a crane located upon the molding-floor which is utilized to lift the cope or drag from said floor or from a transfer-carriage and deposit it upon the outwardly-swung crane-arm that is to receive it, said arm being then swung inwardly a proper distance to center the flask-section upon the platen.

In Fig. 8 the revolubly-movable crane is shown having a flask-section suspended by its trunnions upon a yoke K, that is hooked upon the outer end portions of the trunnions of said flask-section, so as to afford room for an engagement of the trunnions by the grooved limbs of a crane arm J or the standards of a transfer-carriage, which will be further mentioned. Preferably the crane-arms J are each provided with a similar hydraulic lifting device, which consists of a cylinder M, that is attached upon the housing below the crane-arm, the plunger-rod $h$ of the "hoist" being connected in axial alignment with the shaft J' of the crane-arm J, the latter named being revolubly supported on the shaft, and the shaft maintained in a vertical plane by the boxes $J^2$, that are secured upon the housings B, as shown in Figs. 1 and 7.

There are proper inlet and outlet pipe connections $i$ for the introduction and removal of water that are controlled by lever-valves $i'$ to permit quick action, it being understood that the water is supplied from a source that will afford requisite pressure for the vertical movement of the plunger-heads M', (shown in Fig. 16,) and when a proper height is attained and the lowering of the arm J to be effected the inlet-valve is closed and the outlet-valve opened to discharge the water. The weight imposed on the plunger-head will expel the water that will flow off through a proper waste-channel, (not shown,) all the hydraulic lifts being similarly operated as they may be required for the easy movement of the flask-sections.

Two patterns N O are furnished for the molding of a wheel. The pattern N, forming the outer face of the wheel, is used in connection with the drag-section I, and is represented in position for service in Figs. 1 and 3. The face of the pattern N that is to produce an impression on the sand in the flask-section mentioned is held in position to enter the latter by a removable attachment of the pattern upon the face of the abutment-plate D', which is preferably effected in the following manner: An axially-central shank $k$ is secured to project a proper distance from the flat face of the pattern at right angles thereto, having a conical head formed on its free end and a square shoulder on said head. The abutment-plate D' is centrally and vertically apertured, said hole being cylindrical and of a diameter to receive and loosely embrace the body of the shank or locking-pin $k$. A slide-bolt $k'$ is secured in such a relative position on the cross-head D that it will have its latching end projected normally within the aperture of the abutment-plate by a spring $k^2$, that is adapted to force the bolt toward the pin $k$ and cause it to interlock with the shoulder on the head of the pin, thereby securing the pattern N in a suspended position upon the abutment-plate when the parts are brought together. A tripping-lever $k^3$ is connected with the slide-bolt $k'$, and also with a block $k^4$, through which the bolt slides in a manner that will cause the withdrawal of the slide-bolt from a latched engagement with the head of the locking-pin $k$ when the lever is vibrated toward said pin and effect a release of the pattern from the abutment-plate. As it is necessary to retain the pattern N in place during the molding operation within the supplementary ring I' of the drag-section I and have its flat surface aligned with the reversed free edge of the ring, as will appear, this edge of the supplementary ring is provided with turn-buttons $m$, (shown in Figs. 1 and 6,) which may be adjusted to engage the pattern, or, if moved outwardly, release it. The cope-pattern O is also provided with a locking-pin $o$, of a similar form with the pin $k$, and is held to the abutment-plate D' by the same means. The cope-section of the flask having the chiller-ring H' secured on it does not require a supplementary ring in addition thereto, as the latter-named piece takes the place of such an adjunctive feature and affords room to receive loose sand on the pattern O, which is afterward compacted by the pressure of the molding-machine so as to occupy the flask-section only, leaving the face of the chiller exposed to have contact with the molten metal poured in the mold, the relative position of parts being clearly shown in Fig. 13.

In order to expedite the handling of the flask-sections H I, there is a transfer-carriage S provided, which is preferably constructed substantially as shown in Figs. 9 and 11, wherein side and end views of the same are presented. Said carriage is mounted upon wheels for its easy movement, and has the opposite standards $n$ erected on the sides above the main wheels S', these standards being of such a relative height as will permit them to support a flask-section H or I upon their transversely-grooved upper ends by the engagement therewith of the trunnions which project from the flask-sections before mentioned. The transfer-carriage S is provided, also, with bracket-arms $n'$, which are adapted for vertical adjustment and afford a supporting-base, whereon the flask-section will rest and be retained in a level position when the arms are secured in proper position to effect such a support, and each bracket is also designed to sustain the edge portion of one of the patterns N O when the pattern and its appropriate flask-section is in position on the transfer-carriage.

In putting the molding-machine and coacting devices into service for the rapid and perfect production of molds for wheels, if a cope-section H is to be molded, this flask-section is placed upon the standards $n$ of the transfer-carriage with the pattern O in place, the chiller-ring H' resting upon the bracket-arms $n'$ and the pattern also. There is an elevated sand-hopper T, preferably used to supply sifted sand to the flask-sections, shown in Fig. 12, this device having a sand-elevator T' connected with it, which may be actuated by any convenient means, so as to transport sifted sand rapidly from the floor on which the hopper stands upwardly and into the latter, from which it can be discharged by a manipulation of the valve $p$ and its actuating-lever $p'$. When the cope-section has been filled with sifted sand, either from the floor or hopper T, a bottom plate H³ is placed upon it and clamped to the flask-section, which is then reversed in position by first dropping the bracket-arms of the carriage in the slots of the standards and turning the flask-section over, so as to bring the pattern on top. The transfer-carriage S is now moved to the molding-machine and the crane-arm J moved outwardly to engage the trunnions of the flask-section, as shown in Fig. 9. The hydraulic lifting device, which is connected with the crane-arm used, should now be operated to place the crane-arm in a horizontal plane slightly below the trunnions of the flask-section, which will allow these projections of the flask to be seated in the grooves of the crane-arm if the hydraulic mechanism is manipulated by its valves to effect this result. After the cope-section H has been engaged by the crane-arm J the latter is swung inwardly above the platen G and lowered thereon by use of the hydraulic lift and centered by any proper means, so that an upward movement of the platen G will cause the pattern O to press upon the sand in the chiller-ring H' and compact it, the proper degree of compression being determined by the impinging contact of the edge of the chiller-ring with the gage-blocks $r$, which are secured upon the lower face of the cross-head D at proper points to permit such an engagement. After the mold has been pressed in the manner stated the valves of the hydraulic press are changed so as to shut off the influx of water and open the waste-valve for the free exit of water from the cylinder F, which will permit the platen and flask-section on it to descend by gravity until the trunnions on the chiller-ring H' enter the grooves in the limbs of the crane-arm J, which has remained stationary, the further descent of the platen G imposing the weight of the flask-section on the crane-arm, so that the flask-section can be swung outwardly and placed upon the standards of the transfer-carriage S, to be moved to any part of the molding-floor desired, where it is lifted and deposited by a local crane, as previously mentioned. The perfect control of the descent of the platen G and preservation of a horizontal condition for the same throughout its movement downwardly lowers the flask-section without jar or lateral movement, so that the stationary pattern O is released from its embedment in the sand and produces a perfect counterpart mold of its face, dispensing with hand work usually needed to restore injured portions of a mold executed by other means. The molding of the drag-section I is conducted in the same manner as has been explained with reference to the cope-section, the bottom plate I² being placed on the flask proper after the sand has been introduced upon the drag-pattern N, which rests upon the turn-buttons $m$ and also upon the bracket-arms of the transfer-carriage S. After the bottom plate has been secured to the flask proper, and the ring I' also, the flask is reversed in position on the standards $n$ of the carriage and then transported to the molding-machine, where the operation of pressing the sand into the flask is performed, as shown in Fig. 3. After the pattern is released by lowering the flask-section away from it the latter named is removed by employment of the crane-arm J it is made to engage, and from it is transferred to the carriage S, which is run to the point where the completed wheel-mold is to be located, when the supplementary ring I' is removed and the cope-section placed on the drag-section after the cores which are necessary for the proper formation of the wheel have been placed in position.

There may be two or more transfer-carriages used and a set of operatives working on both sides of the molding-machine, so that the pressing operation can be continuously conducted and a large amount of work performed in a short time with comparatively cheap unskilled labor and a less number of workmen than is required to mold an equal number of wheels by hand process.

It is claimed for this method of molding that it is more rapid, does more perfect work, affords a more even quality in the product, cheapens the production, and increases the durability of the wheels thus molded on account of the avoidance of projections due to imperfections in ramming the mold and drawing the pattern by hand process. The use of the patterns in the manner herein stated gages the thickness of the wheel-plates accurately, so that any number of wheels cast from the same quality of metal will have almost the same weight, being within one per cent. of a fixed standard for weight, which it is impossible to effect by hand process.

It is further claimed for the machine that by the simple change of thickness given to the gage-plates $r$ the weight of the wheels of a certain diameter can be increased or diminished without alteration of the cope or drag patterns.

Having thus fully described my invention, I claim as new and desire to secure by Letters Patent—

1. In a machine for sand-molding, the combination, with a base-plate, two upright housing-pieces thereon spaced and secured, and a cross-beam connecting the tops of the housings, of a hydraulic motor secured on the base-plate between the housings, a platen on the motor moved vertically thereby and supported by guides on the housings, a cross-head secured adjustably at its ends to the housings and by its center to the cross-beam, a depending abutment-plate on the cross-head vertically above the platen, and a latching device to secure the platen to the abutment-plate, substantially as set forth.

2. In a machine for sand-molding, the combination, with a base-plate, two housing-pieces upright thereon, and a connecting cross-beam on the housings, of a swinging crane-arm on one of the housing-pieces, which arm is adapted to receive and support a flask-section, a vertically-movable platen, a motor to raise the platen, and a motor to raise the arm, substantially as set forth.

3. In a machine for sand-molding, the combination, with a base-plate, spaced upright housing-pieces thereon, and a cross-beam on the housings, of a swinging crane-arm on a housing-piece and a hydraulic motor to lift and lower the crane-arm, substantially as set forth.

4. In a machine for sand-molding, the combination, with a base-plate, spaced upright housings thereon, and a connecting cross-beam on the housings, of a swinging crane-arm on each housing-piece which is adapted to support a flask-section, a hydraulic lifting device for each arm, a vertically-movable platen, and a hydraulic device to raise and lower the platen that is directly below said platen, substantially as set forth.

5. In a machine for sand-molding, the combination, with a base-plate, two spaced upright housing-pieces thereon, a connecting cross-beam on the housings, a platen vertically movable from the base-plate, and a hydraulic device to reciprocate the platen, of crane-arms adapted to swing on the housing-pieces and each sustain a flask-section and transfer it to the platen, and a hydraulic lifting device for each of the crane-arms, substantially as set forth.

In testimony whereof I affix my signature in presence of two witnesses.

JOHN FORBES.

Witnesses:
DAVID E. TRACY,
J. HERVEY PATTON.